Nov. 28, 1967 H. R. GRUBB ETAL 3,355,722

COMPACT SEMI-PERMANENT INFORMATION STORAGE UNIT

Filed April 20, 1965 5 Sheets-Sheet 1

INVENTORS
HAROLD R. GRUBB
JOHN W. HASKELL
PHILIP A. LORD
EDWARD F. RENT

BY Henry E. Otto Jr.
ATTORNEY

COMPACT SEMI-PERMANENT INFORMATION STORAGE UNIT

Filed April 20, 1965

COMPACT SEMI-PERMANENT INFORMATION STORAGE UNIT

Filed April 20, 1965 5 Sheets-Sheet 3

United States Patent Office 3,355,722
Patented Nov. 28, 1967

3,355,722

COMPACT SEMI-PERMANENT INFORMATION STORAGE UNIT

Harold R. Grubb, Owego, John W. Haskell, Endwell, Philip A. Lord, Vestal, and Edward F. Rent, Endicott, N.Y., assignors to International Business Machines Corporation, Armonk, N.Y., a corporation of New York Filed Apr. 20, 1965, Ser. No. 449,500
12 Claims. (Cl. 340—173)

This invention relates to information storage units, and in particular to a compact packaging arrangement for a semi-permanent read-only storage unit of the card capacitor type.

There has been increasing interest in recent years in providing semi-permanent storage for storing data, such as micro-programs, that are infrequently changed. A wide variety of semi-permanent types of storage units have heretofore been proposed, including those wherein holes are punched in a capacitor-plate defining element or else in the dielectric between the capacitor plates to provide a corresponding unique pattern of binary coded data. When a selected word line is addressed, an output denoting a binary "1" or "0" will be provided at each bit position of the selected word according to whether capacitive coupling is permitted or prevented, respectively, at such bit position.

Irrespective of the specific form this semi-permanent storage unit may take, however, it is desirable that the storage unit be compact, preferably modular in form, and employ as many components of identical configuration as possible.

The principal object of this information is therefore to provide a compact semi-permanent information storage unit of the above general type.

Another object is to provide an information storage unit which uses many parts of identical configuration, some of which are variously oriented to render the unit more compact.

Still another object is to provide a compact card capacitor type read-only storage unit wherein data-bearing record cards are held in intimate contact with dielectric coated etched circuits at adjacent sides of spaced memory boards by inflatable members that are readily deflatable to facilitate replacement of such cards.

According to these objects, the compact information storage unit comprises readily removable first elements, such as record cards, that are prepunched or otherwise conditioned to provide a predetermined pattern of data in the form of binary words. These cards abut corresponding second elements, such as normally fixed memory boards with etched circuits to which interrogating input signals are applied via sets of drive connectors and from which output signals corresponding to the selected word are taken via sets of sense conductors. The input signals are decoded to select a unique word for interrogation; and the output signals correspond to the binary coded data constituting the selected word. The memory boards are arranged in spaced parallel relationship, and a single inflatable pressure-applying member is sandwiched between adjacent boards. Each inflatable member is enveloped by an electrostatic ground shield. Each member, when inflated, effectively presses eight record cards (four per board) into intimate contact with corresponding spaced etched circuit areas, four of which are provided on adjacent sides of the memory boards.

According to one feature of the invention, adjacent memory boards can be spaced apart a distance smaller than the width of the drive connectors, while permitting all memory boards to be of identical configuration. This is achieved by providing each identical flat rectangular board with a portion having a projecting edge to which a corresponding drive connector is edge-mounted, and staggering the projecting edges of adjacent boards so that adjacent drive connectors will be intentionally misaligned to assure that they cannot physically interfere with each other. Preferably, all drive connectors are connected to one common side of the unit by turning every alternate board upside down; and the sense connectors are preferably connected to another common side of the unit. The width of the sense connectors is less than the distance between adjacent boards, rendering it unnecessary to stagger these connectors. However, so that the output signals can be taken off the top of the unit irrespective of whether the memory board is in normal position or the upside down position, sense terminals are provided on both the top and bottom edges of the boards.

Other objects and advantages will become apparent from the following more detailed description of a preferred embodiment of the invention and from the accompanying drawings, wherein.

*Description*

The information storage unit embodying the invention comprises a plurality of spaced, parallel, vertically extending, flat memory boards 11 of identical configuration. Each board 11 preferably is of the multi-layer laminated type formed of two copper-clad glass epoxy layers. The epoxy acts as a rigid insulating substrate. The copper layer between the epoxy layers serves as an internal ground plane, whereas the outer layers of copper are suitably etched (such as by conventional photo-resist techniques) to provide desired circuit patterns on both exterior sides of the board (see FIGS. 2A, 2B). The circuit pattern etched on each side of each memory board includes four vertically spaced identical areas W, X, Y, Z.

Figure 2A:
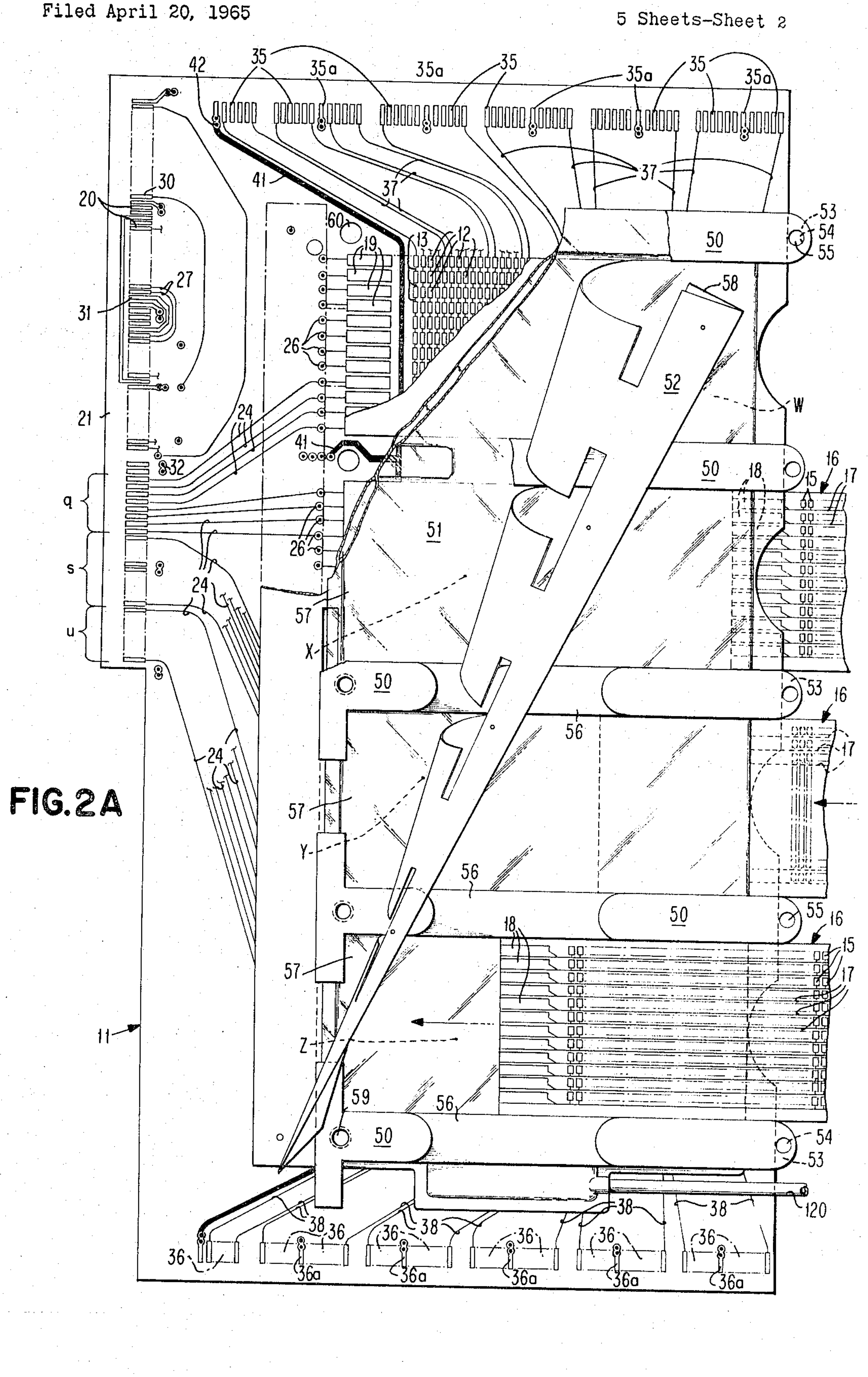
FIG. 2A is a plan view, to somewhat enlarged scale, of a memory board, shown associated with removable information-bearing record cards, guides for retaining said cards, an inflatable pressure-applying member, and an electrostatic ground shield forming part of the unit shown in FIG. 1.
Figure 2C:
FIG. 2C is an end view of the memory board.
Figure 2B:
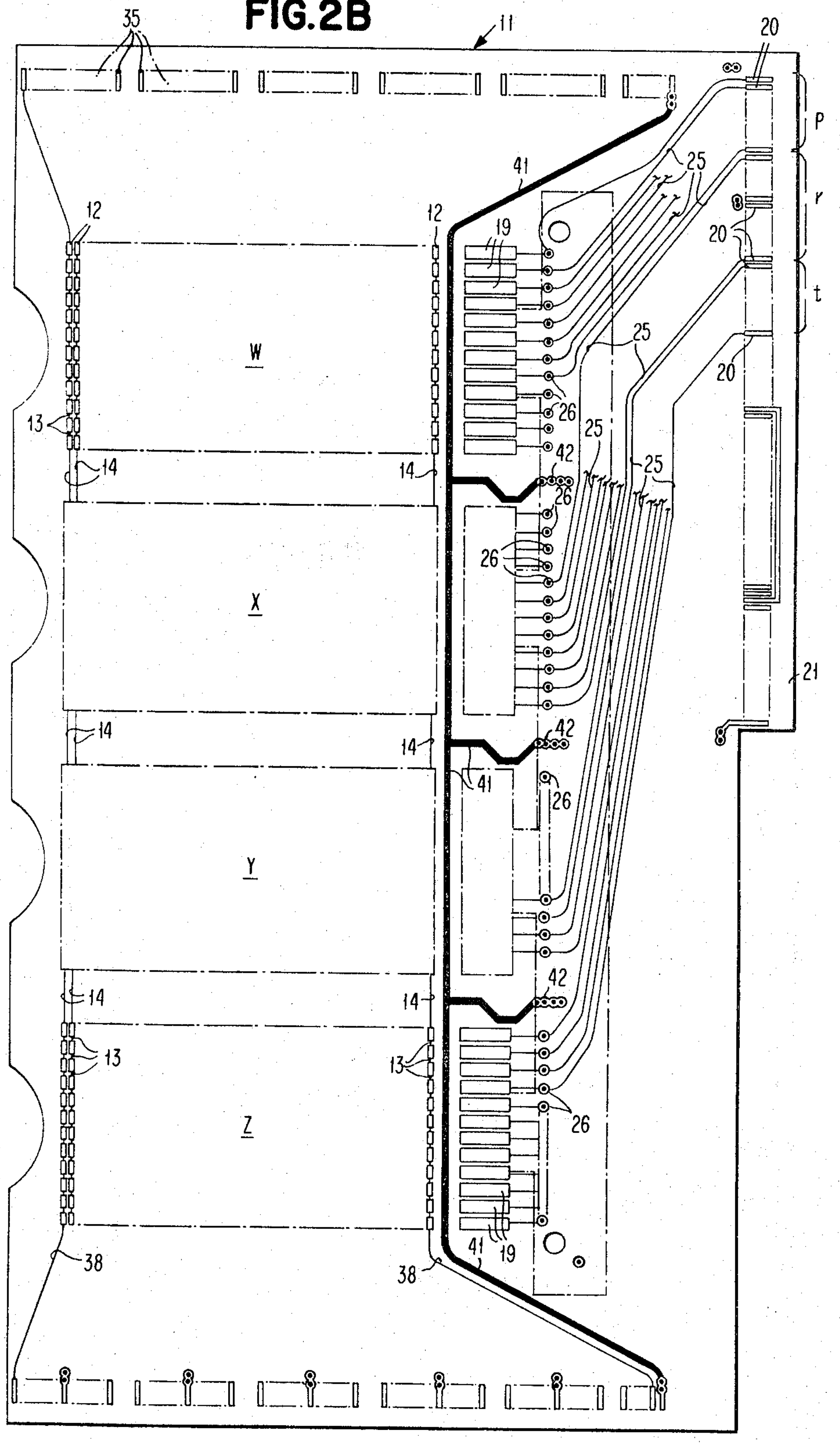
FIG. 2B is a plan view of the opposite side of the memory board.

As illustrated in FIGS. 2A and 2B, each area W, X, Y, Z comprises sixty vertical columns of conductive tabs 12 arranged in twelve horizontal rows. The tabs 12 in each respective row are electrically isolated from each other; but those in each particular column are serially connected to each other by links or leads 13 extending between the respective rows and by jumpers 14 extending between the respective areas W, X, Y, Z. A coating of insulation, such as of Mylar material or an insulating varnish film, covers the 60×12 matrix of conductive tabs 12 in each of the four areas to constitute the common dielectric of a plurality of unique capacitors, one plate of which is defined by each of the seven hundred twenty (60×12) conductive tabs 12 in each of the four areas W, X, Y, Z.

The other plates of these unique capacitors are provided by conductive tabs 15 provided on record cards 16. Each card 16 is preferably of copper-clad Mylar material suitably etched to provide twelve rows of conductors 17. Connected in parallel to each conductor 17 are sixty conductive tabs 15 and an elongated conductive pad 18 which are adapted to overlie corresponding tabs 12 and conductive pads 19 on the board 11 when the unit is assembled in the manner presently to be described.

Thus, each record card 16 provides twelve 60-bit words, one word per row of tabs 15. To denote a binary "0" at any selected bit position in a particular word, the tab 15 at such position is removed, such as by punching. This effectively removes one plate of the unique capacitor at that bit position to prevent capacitive coupling at such position. To denote a binary code "1", the tabs 15 are maintained intact, separated by the previously mentioned dielectric film over the tabs 12; and hence capacitive coupling is permitted at each bit position where both capacitor-plate defining tabs 12, 15 remain intact. A separate record card 16 mates with each area W, X, Y, Z at each side of each board 11. Hence, as illustrated, each board and its associated eight record cards 16 provide ninety-six (8×12) 60-bit words.

Figure 1:
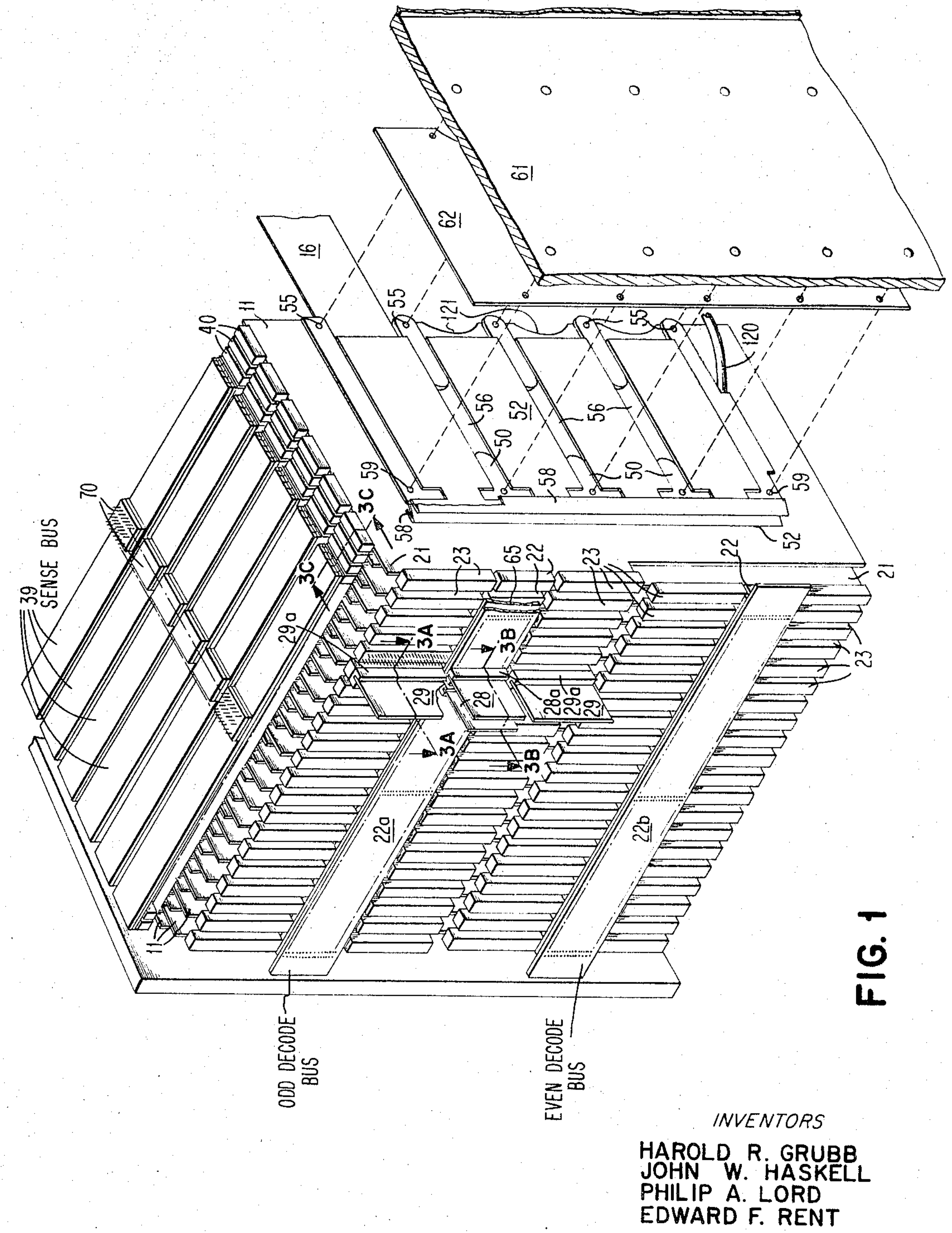
FIG. 1 is an isometric, partially exploded view of a compact information storage unit embodying the invention.
Figures 3A, 3B, 3C, 4:
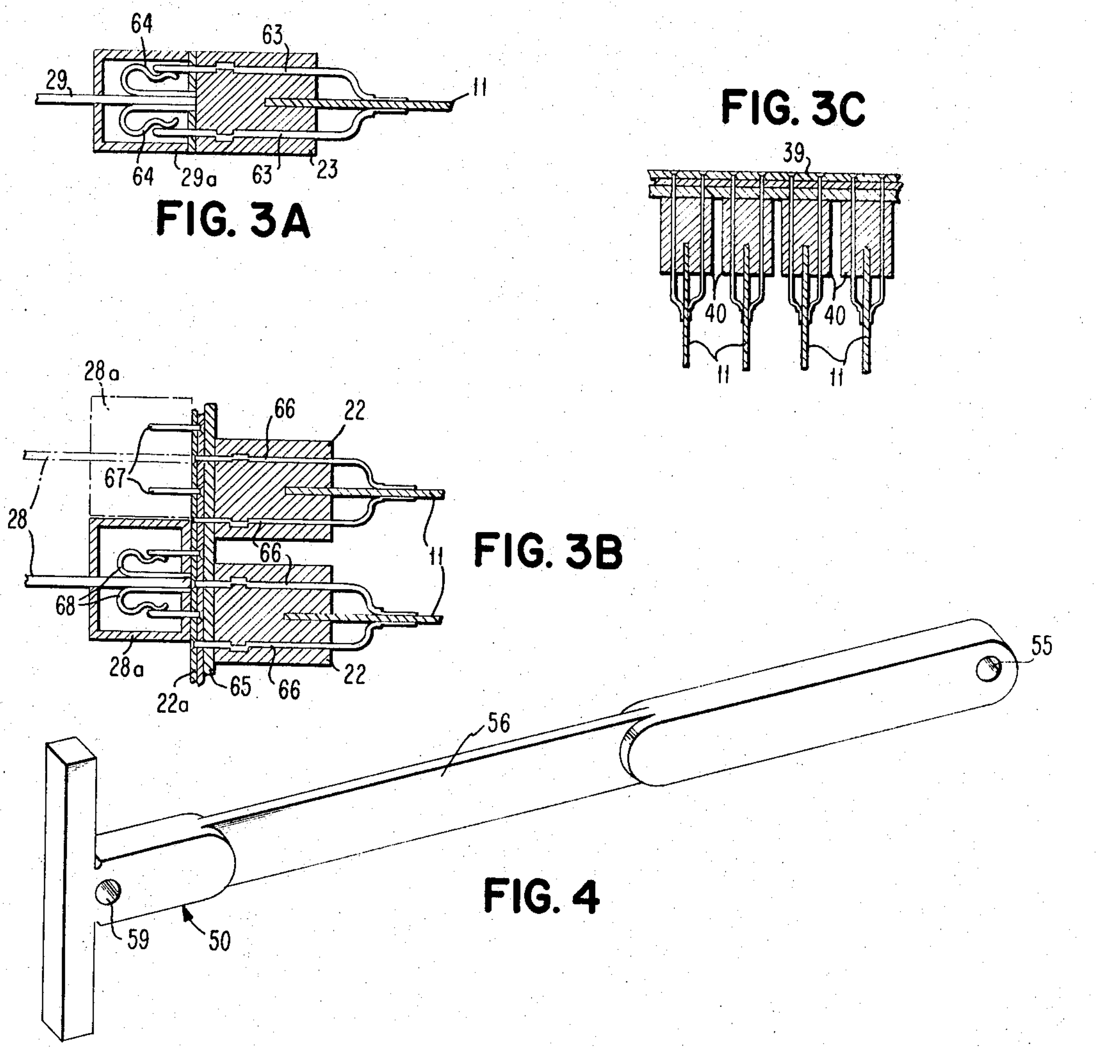
FIGS. 3A, 3B and 3C are fragmentary section views of the unit taken along the lines 3A—3A, 3B—3B, and 3C—3C, respectively, in FIG. 1.
FIG. 4 is a perspective view, to enlarged scale, of one of the guides shown in FIGS. 1 and 2A.

A plurality of terminals, including input terminals 20, are provided along a projecting portion 21 of each board 11. As best shown in FIGS. 1, 3A and 3B, an adapter socket 22 is disposed between a pair of adaptor sockets 23, all three of which sockets are electrically mounted to the edge of the projecting portion 21 of each board. The conductive pads 19 (FIG. 2B) are aligned with, but spaced from, each row of tabs 12 on each side of each board 11. Note that twenty-four input terminals 20 on the side of board 11 shown in FIG. 2A are connected via respective leads 24 to the second, fourth and sixth groups *q, s, u* of eight pads 19; whereas twenty-four different input terminals 20 on the other side of the board are connected via respective leads 25 to the first, third and fifth groups *p, r, t* of eight pads 19, as shown in FIG. 2B. However, when a decoded input signal is applied to a selected one of the leads 24 or 25, it will actually drive two words (one on each side of the board) because corresponding overlying pairs of pads 19 on opposite sides of each board are connected to each other via conventional plated-thru holes, such as 26.

Jumpers, like 27 (FIG. 2A), electrically interconnect certain of the terminals on the projecting portion 21 to convey signals between a respective program card 28 (FIG. 1) and either of two driver decode cards 29 via a decode bus 22*a* or 22*b*. Each card 28 is associated with a socket 28*a* that is plugged to a respective set of pins 67 (FIG. 3B) carried by decode bus 22*a* or 22*b*. Each card 29 is associated with a socket 29*a* that is plugged to an adapter socket 23 (FIG. 3A). Signal input terminals, like 30, 31 (FIG. 2A), are connected to direct-current voltage sources (not shown) and jumpered.

Figure 5:
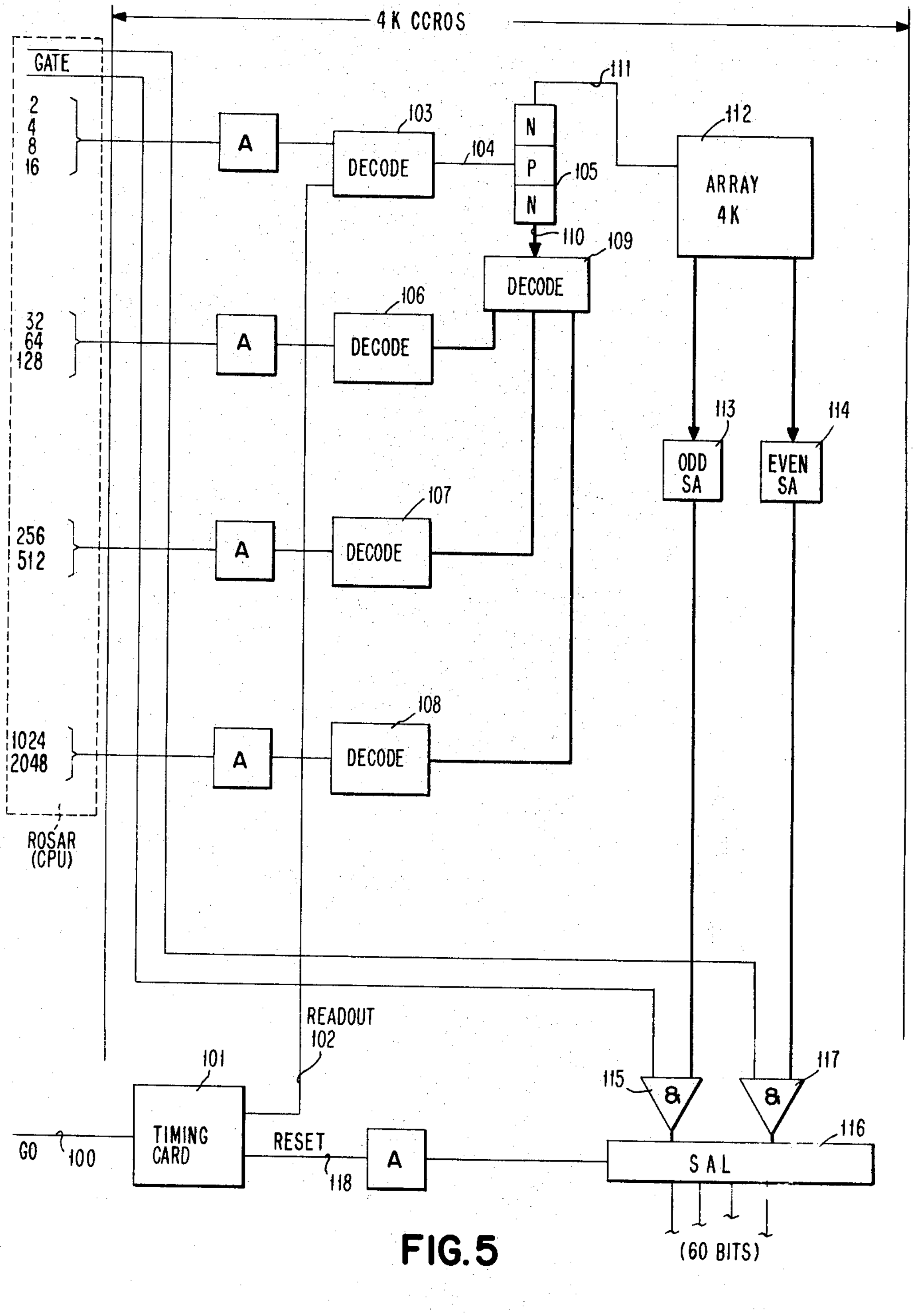
FIG. 5 is a schematic circuit diagram of the addressing circuitry for the storage unit.

The program cards 28 carry signal lines which perform decoding of the signals to the emitters of transistors 105 (FIG. 5). Cards 28 are plugged onto the decode busses 22*a* and 22*b* at each position of a memory board 11. By selecting and plugging a given program card 28, the associated memory board 11 is assigned a series of ninety-six addresses according to the way in which signal lines exist on such card. These lines interconnect the terminal pins 67 some of which are in turn connected to adapter socket pins 66 (FIG. 3B). Thus, memory board addresses may exist in groups of ninety-six and the groups can be in any random order depending upon the circuits on the cards 28. This feature offers additional advantages in that unused (spare) memory boards can exist in the array and may be utilized simply by transferring cards 28 from one memory board (e.g., in case of failure of a memory board) to the card 28 location on the spare board and by also adding the necessary driver circuit cards 29 and transferring the record cards 16.

As viewed in FIGS. 2A and 2B, one set of sixty sense or output terminals 35 is provided adjacent the upper edge at each side of each memory board 11, and a similar set of sixty output terminals 36 is provided adjacent the lower edge of each side of board 11. On each side of the board, the terminals 35 are connected by separate etched leads 37 to corresponding individual columns of tabs 12 and via separate leads 38 to the corresponding terminals 36. Note that the output terminals 35, 36 on one side of the board are not connected to those on the other side; and the internal ground plane serves as an electrostatic shield to isolate the sets of capacitors at one side of the board from those at the other. Thus, output signals corresponding to the data contained in selected odd-and-even counterpart 60-bit words overlying each other on opposite sides of the board will be taken selectively from terminals 35 or terminals 36 according to which of these sets of terminals is connected to sense busses 39 (FIG. 1) via respective sense sockets 40 that are edge-mounted to the board.

On each side of each board 11 a thickened etched circuit line 41 is connected to the internal ground plane via a plurality of plated-thru holes 42. This line 41 extends from the upper to the lower edge of each board for electrostatically isolating the conductive pads 19 from the tabs 12 and their associated output terminals 35, 36. Terminals like 35*a*, 36*a* are interspersed within each group of output terminals 35, 36 to provide ground connections for each sense bus 39 via plated-thru holes connected to the internal ground plane.

The novel structure for holding the record cards 16 in accurate registration and intimate contact with the memory boards 11 will now be described. Briefly, and as best shown in FIGS. 1, 2A and 4, the cards 16 are insertable into guideways provided by guides 50 that accurately position the cards so that their tabs 15 and pads 18 will overlie the corresponding tabs 12 and pads 19 on the board. Each guide 50 is preferably formed of plastic and glued or otherwise affixed flatwise to the board. A separate inflatable air bag 51 (FIG. 2A), enveloped by a corresponding single electrostatic ground shield 52, is sandwiched between each set of adjacent boards 11. When inflated, each bag 51 presses against both folds of the corresponding shield 52 thereby pressing eight record cards 16 (four per board) into intimate contact with their respective boards.

More specifically, each bag 51 is preferably formed of plastic material and generally rectangular in configuration except for tabs 53. Each tab 53 has a hole 54 that is alignable with a hole 55 provided in a portion of the corresponding guide 50 that projects rearwardly from the rear edge of the board. Each air bag is compressed by and between the guides 50 on adjacent boards, except by and at the central portion 56 of such guides. These central portions are of reduced thickness to permit air flow between four rectangular chambers 57 that are molded in each bag 51 and have areas substantially coextensive with those of the record cards 16.

The shields 52 prevent capacitive coupling between adjacent memory boards 11 and reduce the fringing effect between the respective conductive pads 19 and tabs 12 on each board. Each shield 52 is preferably of Mylar material having one surface thereof completely clad with copper. Each shield is folded in half such that its then exposed outer surfaces are of Mylar material for making insulative contact with the cards. The copper-clad surface of each shield envelopes and contacts the chamber-defining areas of a corresponding air bag 51. However, the ends of each shield remote from the fold line are turned back to expose narrow elongated copper-clad surfaces 58. These surfaces enable the shield to be electrically attached (e.g., by soldering) at selected points to the adjacent faces of the boards between which the shield is disposed. Hence, each shield 52 is electrically connected to adjacent boards 11; and the bags 51 are anchored by being clamped between adjacent guides 50. The memory boards 11 are, in turn, carried by five tie rods (not shown) that pass through the holes 54, 55 respectively, in the bags 51 and guides 50, and by five other tie rods (not shown) that pass through holes 59 (FIGS. 2A, 4) and holes 60 (FIG. 2A) in the boards. These ten tie rods, in turn, pass through and are supported by metallic end plates 61 that are insulated from the endmost memory boards 11 by respective insulating boards 62.

According to another feature of the invention, the "even" memory boards 11 which are sandwiched between the "odd" memory boards 11 are turned upside down such that the projecting portions 21 of all "even" boards lie below the central plane of the storage unit, and the projecting portions of all "odd" boards lie above said plane, and the projecting portions of both the "odd" and "even" boards project from the same side of the storage unit (i.e., the front side as viewed in FIG. 1). This staggered "W-like" arrangement of the projecting portions 21 desirably permits the boards 11 to be spaced apart a distance less than the width of the drive adapter sockets 23. These sockets may be of the type shown in FIG. 3A, each comprising a plurality of cooperating pairs of pins 63 that make electrical contact with terminals at opposite sides of a particular memory board. These pins 63, in turn, make electrical contact with the outer sides of respective curved spring contacts 64 that make electrical contact with opposite sides of a corresponding driver card 29.

Since the projecting portions 21 are staggered alternately above and below the central plane of the unit, "odd" driver decode busses 22*a* and "even" decode busses 22*b* must be provided. Each memory board 11 may be connected to the appropriate multi-layer bus 22*a* or 22*b* in the manner shown in FIG. 3B. Note than an aligner 65 of nonconductive material is preferably interposed between the appropriate multi-layer decode bus 22*a* and edge of each board 11 to prealign the numerous pairs of pins 66 on which the bus is mounted. Half pins 67 are soldered to and carried by the bus 22*a* or 22*b*. These pins 67 make electrical contact with the spring contacts 68 which are part of the program cards 28.

As shown in FIG. 3C, the sense sockets 40 are generally similar but narrower than drive sockets 23 and, in fact, are narrower than the distance between adjacent boards 11. Hence, the sense sockets need not be arranged in a staggered pattern. However, since alternate boards 11 are upside down, it is necessary to provide the two sets of output terminals 35, 36 so that output signals can be taken off the same (e.g., top) edge of the unit via the six side-by-side arranged sense busses 39, rather than off both the top and bottom edges of the unit as would be necessary if only one such set of output terminals were provided. Each sense socket 40 (except one) connects eleven pairs of output terminals 35 to a respective one of the sense busses 39, there being one terminal of each pair at each side of the board. Each bus 39 is connected to the aligned sense sockets 40 that are edge-mounted to each of the forty-two memory boards 11. Each of the six sense busses 39 is, in turn, connected by a cable card 70 and twisted pair cables (not shown) to an etched circuit board (not shown) having electrical connections with a central processing unit.

As shown in FIG. 5, a read only storage address register ROSAR in the central processing unit CPU is appropriately conditioned to address and read out a particular word in the storage unit. The address register ROSAR is a 12-bit register which provides true outputs (like "16") and also their complements (like "$\overline{16}$"), or in other words, the positive and negative signal for each of the 12 bit positions.

Figure 6:
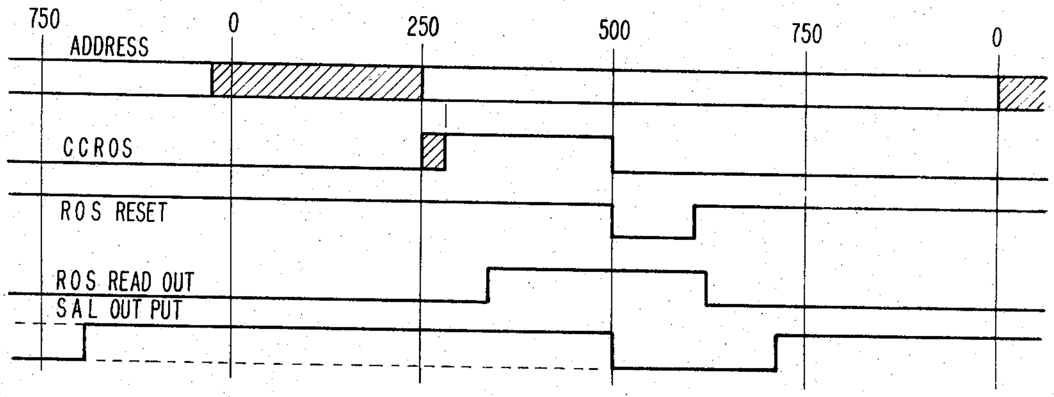
FIG. 6 is a timing diagram for the circuitry shown in FIG. 5.

As shown in FIGS. 5 and 6, during each read only storage cycle, the address register ROSAR is conditioned to select a desired address before a "GO" pulse comes up in line 100. This GO pulse triggers a delay line (not shown) on a timing card 101 to bring up a readout pulse in a line 102. The four bit positions "2", "4", "8", and "16" of the register ROSAR are "ANDed" with line 102 at 103 to provide a one-out-of-sixteen decoded signal via lines 104 to the bases of a selected one-of-sixteen groups of driver transistors 105 in a 16×126 driver transistor matrix. The outputs from the "32" to "2048" bit positions are decoded into three groups by appropriate decode circuits 106, 107, 108. Final decoding of the outputs from 106, 107, 108 is effected by decode circuits 109 that are provided on the driver cards 29 and provide signals via lines 110 to the emitters of the selected one-of-one hundred twenty-six groups of sixteen transistors 105. Note that since there are ninety-six words per memory board and forty-two such boards, the 4K array includes 4032 words; hence, while the 12-bit ROSAR has the capability of decoding up to 2048 words, only 2016 (corresponding to the total number of driver transistors 105) are actually used. During addressing in the manner just described, only that particular one of the 2016 transistors 105 that has its base and emitter concurrently pulsed via lines 104, 110 will be turned on to provide a distinctive output from its collector to an appropriate one of the 2016 lines 111. Each line 111 leads to a distinctive input terminal 20 in the 4K array 112. As already noted, when an input signal is applied to any terminal 20, two words (at corresponding locations on opposite sides of the same memory board 11) will be concurrently addressed. This is because each input terminal is connected via plated-thru holes 26 to a corresponding pair of overlying conductive pads 19 on the memory board. Hence, output signals will be transmitted via the output terminal 35 (or 36) at each side of the board to separate sets 113, 114 of sixty sense amplifiers, making a total of one hundred and twenty sense amplifiers for the array. The sixty outputs from the "odd" set of sense amplifiers 113 will be gated out via AND gate 115 into a 60-bit sense amplifier latch 116 if the true signal is up in the low order digit position of the register ROSAR; i.e., if a "1" is up. If the complement signal ("$\overline{1}$") is up at the low order digit position of the register ROSAR, sense signals will be "ANDed" at 117 with the outputs from the "even" set of sense amplifiers 114 and thus gated out into sense amplifier latch 116.

Thus, by concurrently addressing two words and reading each word out into separate sets 113 and 114 of sense amplifiers and then selecting one or the other of these words according to to whether the address is odd or even, only 2016 driver transistors 105 are needed to address the 4K (4032-word) array; but, of course, one hundred and twenty sense amplifiers (instead of sixty) are required.

The GO pulse in line 100 also causes the delay line (not shown) on timing card 101 to generate a reset pulse in a line 118 which is amplified at A to reset the sense amplifier latch 116; i.e., to provide a binary "0" in each of the sixty bit positions thereof during the particular interrogation cycle.

It should be noted here that the input signals applied to any one of the conductive pads 19 on a particular board 11 are preferably directly electrically coupled by abutting contact of such pad with a conductive pad 18 on the corresponding record card 16; i.e., no dielectric separates these pads 18 and 19. However, if preferred, the dielectric film that separates the tabs 12 on the board from the tabs 15 on the cards may be extended to provide an intervening dielectric such that an input signal applied to a pad 19 will be capacitively coupled to the pad 18 on the card then capacitively coupled back to the board in parallel at those ones of the sixty bit positions where no capacitor-plate defining tabs 15 have been removed from the card.

It should also be noted that the record cards 16 are preferably of the same size as conventional tabulating cards used in data processing machines, and the rows and the columns of tabs 15 are preferably arranged on centers corresponding to those employed on such tabulating cards. This enables the cards to be punched by conventional tabulating card punching machines. It also desirably enables tabulating cards with conductive ink patterns to be used and processed either as tabulating cards or as record cards in a read-only storage unit.

Obviously, the number of record cards 16 which contact each board 11 and the number of word-defining rows and/or number of word-length-defining columns of such cards may be varied as desired, without departing from the teachings of this invention.

Note further that the bags 51 are connected by flexible tubing 120 to a common supply manifold (not shown) which is normally charged with pressure fluid to keep the bags inflated for normally maintaining the record cards clamped against the respective boards. However, the manifold may be vented by suitable valve means for deflating these bags. This relaxes the pressure the bags normally exert against the record cards and enables easy removal of the cards from the guides 50. The rear ends of the boards 11 are preferably relieved at 121 to facilitate grasping the rear edges of the cards to simplify their removal.

Edge-mounting the various sockets 23, 40 to the memory boards is an important feature because it provides the low impedances and short line lengths which enable a practical information storage unit of the compact type herein disclosed.

More specifically, it is essential in this invention to minimize disturbances to unselected input lines 111. Since adjacent input lines must necessarily be located in close proximity to each other, some electrostatic and electromagnetic coupling between these lines will exist. Moreover the ground reference line between memory board 11 and any given driver card 29 has some impedance which is common to all driver transistors 105 on the cards 29 so that operation of one drive transistor can, by means of this common impedance, induce disturbances into the remaining drive transistors on the same card 29. The magnitude of these undesirable effects is directly proportional to the lengths of the connecting lines. Edge-mounting the sockets 23 for the driver cards 29 significantly reduces these undesirable effects by minimizing the line lengths.

Similarly, edge-mounting the sockets 40 to the memory boards 11 permits the sense terminals 35 or 36 of the forty-two memory boards 11 to be connected together conveniently by the sense busses 39 to minimize line lengths and hence the time for signals to be transmitted from the memory board to the cable cards 70.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A compact information storage unit of the type wherein precoded unique data-bearing record elements abut circuit boards from which output signals are taken according to the area of such board to which an interrogating input signal is applied, characterized by:

said boards being of identical configuration, each with at least one portion of a selected edge projecting forwardly of the remaining portion thereof, said boards being oriented in different angular positions to provide a staggered pattern of projecting edges, and a plurality of members, each having a width greater than the lateral spacing between adjacent boards, and secured to corresponding selected edges according to said staggered pattern.

2. A compact information storage unit according to claim 1, further characterized in that:

alternate ones of said boards are turned over such that the projecting selected edges are staggered alternately to either side of an imaginary plane, and the corresponding selected edges of all boards project from a preselected side of the unit.

3. A compact information storage unit according to claim 1, further characterized in that:

each board is generally rectangular and has two flat sides joined by edges including said projecting edges, and plated-thru holes electrically connecting corresponding data bit locations on opposite sides of each such board, at least one record element lies flat against each such side of each board to cause an interrogating signal applied via one of such members to be concurrently transmitted to corresponding locations at opposite sides of each board for producing two sets of output signals, one from each record element abutting each side of such board, said sets of output signals being distinctive according to the data provided on the respective record elements, and means for selectively gating out one or the other of said sets of output signals according to the presence or absence of a significant data bit in said interrogating signal.

4. An information storage unit according to claim 1, further characterized in that:

a plurality of said record elements are disposed flatwise beside each side of each board, and an inflatable member is interposed between adjacent boards and inflatable to apply a uniform pressure on the elements to maintain them in intimate contact with the adjacent sides of the adjacent boards.

5. An information storage unit according to claim 1, further characterized in that:

said members include socket elements edge-mounted to the respective boards and having pins projecting outwardly therefrom, and busses are mounted over the pins, and printed circuit cards are mounted on the busses, the planes of said cards being parallel to the planes of said boards.

6. An information storage unit according to claim 1, further characterized in that:

alternate ones of said boards are turned upside down such that the projecting selected edges are staggered alternately to either side of an imaginary plane, and the corresponding selected edges of all boards project from a preselected side of the unit, one set of busses are mounted to the members at said one side of said plane, another set of busses are mounted to the members at said other side of said plane, other members having widths not exceeding the lateral spacing between adjacent boards are each edge-mounted to respective other edges of each board, and a third set of busses are mounted on said other members so as to be connected to each of the boards along that side of said unit toward which said other edges extend.

7. An information storage unit comprising, in combination, a plurality of parallel arranged spaced circuit boards substantially identical in configuration having input terminals to which input signals are applied and output terminals from which output signals are taken, at least one memory card mounted against each side of each board and containing preselected information according to a predetermined pattern of word-defining perforations prestored therein, dielectric means between at least certain portions of each card and corresponding board, expansible means disposed between the boards for pressing memory cards into contact with adjacent sides of adjacent circuit boards, and an electrostatic ground shield enveloping said expansible means, the input signal applied to a selected input terminal on a selected board being coupled to a corresponding conductor on the associated memory card and then coupled back in parallel from said card to said board at those points where coupling is permitted by the absence of perforations at such points.

8. An information storage unit according to claim 7, wherein:

the boards have projecting edge portions, and every alternate board is turned upside down, such that the projecting edge portions of successive boards will be staggered alternately at opposite sides of a substantially central plane therethrough, said input terminals extending substantially to the edge of said projecting edge portions and hence being taken exclusively off one edge of the unit, and said output terminals extending substantially to two oppositely disposed different edges of each board to permit output signals to be taken exclusively off another edge of the unit irrespective of whether a particular board is in its normal or upside down position.

9. A compact information storage unit, comprising, in combination:

a plurality of first elements of generally similar configuration bearing preselected unique coded information, a plurality of second elements to which input signals are applied and from which output signals are taken, and which second elements cooperate with corresponding first elements to cause the output signals to correspond to such preselected information in the areas of the associated first elements interrogated by the input signals, said second elements being of substantially identical configuration, with projecting portions provided in at least one part thereof and arranged in a staggered pattern to cause the projecting portions of adjacent ones of said second elements to be oriented in different relative positions, and a plurality of signal-conveying members, at least some of which have a width greater than the spacing between adjacent second elements and are edge-mounted to the projecting portions according to said pattern such that adjacent second elements are compactly spaced at distances less than the widths of said some members.

10. An information storage unit according to claim 9, wherein:

said input signals are applied to a selectable one of a plurality of input terminals arranged complementarily on opposite sides of each second element, and including means electrically interconnecting a conductor at one side of each second element with a corresponding conductor at the opposite side, for causing an input signal applied to an input terminal on one side of a particular second element to be transmitted in parallel to the corresponding conductors at both sides of such element, a means for receiving and storing output signals, and means responsive to the presence or absence of a significant bit of coded information to cause the preselected information at one side or the other side of such second element to be selectively gated out into said receiving and storing means.

11. An information storage unit comprising, in combination, a plurality of spaced parallel circuit boards of substantially identical configuration having input terminals to which input signals are applied and output terminals from which output signals are taken, each board having at least one portion of a selected edge projecting beyond the remaining portion thereof, and said boards being oriented in different angular positions to provide a staggered pattern of projecting edge portions, at least one memory document mounted against each side of each board and containing predetermined patterns of information-defining indicia, and a plurality of members, each wider than the spacing between corresponding points on adjacent boards, said members being edge-mounted to said projecting edge portions according to said staggered pattern to provide a compact storage unit wherein said boards may be spaced closer together than the width of said members and impedances are minimized.

12. An information storage unit according to claim 11, wherein two sets of output terminals are provided each adjacent opposite edges of each board, and every other board is inverted, and each board has a plurality of capacitor-plate-defining tabs arranged in columns and rows, those of each column being connected serially with each other and with corresponding ones of each set of the output terminals, and each memory document has a plurality of capacitor-plate-defining tabs aranged in columns and rows and so spaced as to be adapted to overlie the tabs on a selected board, the indicia on each document denoting a binary "1" if a tab is present at a particular coordinate position and denoting a binary "0" where such tab is not present, and including a plurality of row drive lines, each connected in parallel to those tabs present in each corresponding row of a respective document, whereby an input signal applied via a selected input terminal to a corresponding row drive line of the document will be capacitively coupled in parallel from said document to the tabs on said board at those coordinate positions where capacitive coupling is permitted by the presence of a capacitor-plate-defining tab on the document to provide corresponding output signals at the output terminals, and whereby output signals may be taken along one edge of the unit.

References Cited

UNITED STATES PATENTS

| | | | |
|---|---|---|---|
| 3,235,942 | 2/1966 | Howell et al. | 174—68.5 X |
| 3,251,043 | 5/1966 | Haskell | 340—173 |

BERNARD KONICK, *Primary Examiner.*

J. F. BREIMAYER, *Assistant Examiner.*